United States Patent
Arnoux et al.

(10) Patent No.: US 11,735,056 B2
(45) Date of Patent: Aug. 22, 2023

(54) PILOTING ASSISTANCE SYSTEM AND METHOD FOR AN AIRCRAFT

(71) Applicant: Airbus Operations SAS, Toulouse (FR)

(72) Inventors: Jérome Arnoux, Toulouse (FR); Thomas Pastre, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 300 days.

(21) Appl. No.: 16/572,169

(22) Filed: Sep. 16, 2019

(65) Prior Publication Data
US 2020/0090523 A1    Mar. 19, 2020

(30) Foreign Application Priority Data
Sep. 18, 2018  (FR) ...................... 1858380

(51) Int. Cl.
*G08G 5/00* (2006.01)
*G01C 21/20* (2006.01)
*G05D 1/08* (2006.01)

(52) U.S. Cl.
CPC ............. *G08G 5/003* (2013.01); *G01C 21/20* (2013.01); *G05D 1/0808* (2013.01)

(58) Field of Classification Search
CPC ..... G08G 5/003; G08G 5/0034; G08G 5/0039
See application file for complete search history.

(56) References Cited

U.S. PATENT DOCUMENTS 5,121,325 A * 6/1992 DeJonge ............... G05D 1/0005
                                                           244/182
8,155,866 B2 * 4/2012 Berard ................. G08G 5/0052
                                                           701/120

(Continued)

FOREIGN PATENT DOCUMENTS

EP  2993543 A1  3/2016
FR  2942328 A1  8/2010

OTHER PUBLICATIONS

The Bisection Method for root finding, x-engineer.org, "https://x-engineer.org/undergraduate-engineering/advanced-mathematics/numerical-methods/the-bisection-method-for-root-finding/," Capture taken Aug. 19, 2017 (Year: 2017).*

(Continued)

*Primary Examiner* — Christian Chace
*Assistant Examiner* — Jordan S Fei
(74) *Attorney, Agent, or Firm* — Greer, Burns & Crain, Ltd.

(57) ABSTRACT

A piloting assistance system for an aircraft comprises a flight management computer and a guidance computer. The flight management computer transmits speed setpoints to the guidance computer so as to pilot the aircraft in accordance with an initial speed profile or in accordance with an RTA speed profile following the reception of an RTA constraint. In response to the reception of a setpoint speed selected by a flight crew member in the presence of the RTA constraint, the guidance computer pilots the aircraft at the selected speed and the flight management computer determines a deselection point for returning to a predetermined speed profile while still complying with the RTA constraint. The guidance computer commands the display, on a navigation screen, of a symbol corresponding to the position of the deselection point.

14 Claims, 4 Drawing Sheets

(56) References Cited

U.S. PATENT DOCUMENTS

| | | | |
|---|---|---|---|
| 9,193,442 B1* | 11/2015 | Young | G08G 5/003 |
| 2009/0259392 A1* | 10/2009 | Berard | G05D 1/0202 |
| | | | 701/121 |
| 2010/0217459 A1 | 8/2010 | Caillaud et al. | |
| 2014/0088799 A1* | 3/2014 | Tino | B64C 19/00 |
| | | | 701/3 |
| 2016/0069688 A1 | 3/2016 | Polansky et al. | |
| 2016/0284221 A1* | 9/2016 | Hinkle | G08G 5/0069 |
| 2017/0004713 A1* | 1/2017 | Claybrough | G01C 21/20 |
| 2017/0323570 A1 | 11/2017 | Myren et al. | |
| 2019/0033853 A1* | 1/2019 | O'Laughlin | B64D 37/005 |

OTHER PUBLICATIONS

French Search Report; priority document.

\* cited by examiner

PILOTING ASSISTANCE SYSTEM AND METHOD FOR AN AIRCRAFT

CROSS-REFERENCES TO RELATED APPLICATIONS

This application claims the benefit of the French patent application No. 1858380 filed on Sep. 18, 2018, the entire disclosures of which are incorporated herein by way of reference.

FIELD OF THE INVENTION

The present invention relates to a system and a method for piloting an aircraft that are intended to make it possible to comply with a time of arrival constraint at a waypoint during a flight of the aircraft.

BACKGROUND OF THE INVENTION

Aircraft, in particular military or civil transport planes, are generally piloted along a flight plan containing a set of waypoints defined in three-dimensional space. The aircraft has to be guided along the flight plan while complying with a maximum position error margin with respect to segments linking the various waypoints. Increasingly often, in particular in areas having a high traffic density, some of the waypoints of the flight plan contain a time of arrival constraint generally called RTA (required time of arrival) imposed by air traffic control in order to guarantee satisfactory separation between the various aircraft. In such a case, the aircraft has to be guided along the flight plan while furthermore complying with a maximum time error margin with respect to the RTA constraints of the waypoints containing such a constraint.

Usually, before the flight, a flight crew member enters a flight plan corresponding to this flight into a flight management computer of the aircraft, generally by way of a human-machine interface associated with the flight management computer. The flight management computer is, for example, an FMS (flight management system) computer. Usually, this flight plan may comprise a set of flight segments corresponding, for example, to climbing, cruising and descent phases of the aircraft. A minimum operational flying speed and a maximum operational flying speed of the aircraft are associated with each flight segment. In one particular example, the minimum operational speed is 180 kn (knots), that is to say, around 333 km/h, in the climbing phase, 195 kn (around 361 km/h) in the cruising phase and 195 kn (around 361 km/h) in the descent phase, and the maximum operational speed is 300 kn (around 555 km/h) in the climbing phase, 290 kn (around 537 km/h) in the cruising phase and 290 kn (around 546 km/h) in the descent phase.

The speed of the aircraft is generally planned in the form of a cost index. This cost index usually corresponds to a coefficient of between 0 and 1, such that, when this coefficient is equal to 1, the planned speed corresponds to a maximum operational speed Vmax of the aircraft, and when this coefficient is equal to 0, the planned speed corresponds to a minimum operational speed Vmin of the aircraft. When the cost index is equal to a value k of between 0 and 1, the planned speed is equal to:

$$V\text{min}+k(V\text{max}-V\text{min}).$$

Before the flight, the cost index is entered into the flight management computer of the aircraft by a flight crew member of the aircraft. The flight management computer then determines an initial speed profile for all of the segments of the flight plan by applying this cost index to all of the flight segments. In particular, the cost index may be chosen so as to optimize a usage criterion of the aircraft, for example the consumption of fuel by the aircraft.

During the flight, the flight management computer commands a guidance computer for guiding the aircraft on the basis of the initial speed profile: to this end, it sends a speed setpoint corresponding to the initial speed profile so as to pilot the aircraft in accordance with the initial speed profile in what is called a managed mode. The managed mode is an operating mode of the guidance computer in which the guidance computer commands the speed of the aircraft on the basis of speed setpoints received automatically from the flight management computer.

If the pilot receives an RTA constraint at a waypoint of the flight plan from air traffic control, he enters this constraint into the flight management computer. The flight management computer then calculates an estimated time at which the aircraft will arrive at this waypoint, taking into account the initial speed profile dependent on the value of the cost index entered by the flight crew member. This estimated time of arrival is generally called ETA. Document U.S. Pat. No. 5,121,325 describes a system for determining an estimated time of arrival of an aircraft at a particular point. The flight management computer compares this estimated time of arrival ETA with the RTA constraint. If the difference between the ETA and RTA times is greater than a predetermined time threshold (for example of between 10 and 30 seconds), the flight management computer calculates a new what is called RTA speed profile, dependent, for example, on a new value of the cost index, making it possible to reduce the difference to a value lower than this predetermined time threshold. The flight management computer then commands the guidance computer on the basis of the RTA speed profile, in managed mode.

A flight crew member, in particular a pilot of the aircraft, may sometimes have to modify the speed of the aircraft when it is flying in accordance with an RTA speed profile in order to comply with an RTA constraint at a waypoint. Such a modification may, in particular, correspond to a requirement to increase (respectively reduce) the speed of the aircraft as a one-off, for example if the pilot wishes to quickly make up for a delay (respectively an advance) in order to comply with the RTA constraint. To this end, the pilot enters a speed, called selected speed, by way of an FCU (flight control unit) human-machine interface of the guidance computer. This then engages what is called a selected mode, in which it pilots the aircraft at the selected speed. The selected mode is an operating mode of the guidance computer in which the guidance computer commands the speed of the aircraft on the basis of speed setpoints selected by a flight crew member, for example by way of the FCU. However, if it were to be maintained, the selected speed would not make it possible to comply with the RTA constraint at the waypoint. Therefore, the pilot has to deactivate the selected mode, thereby allowing the guidance computer to return to managed mode. To facilitate piloting of the aircraft, there is a need to automate the return to managed mode.

SUMMARY OF THE INVENTION

An aim of the present invention is to meet this need. It relates to a piloting assistance system for an aircraft, the system comprising a flight management computer for managing the flight of the aircraft and a guidance computer for guiding the aircraft, wherein the flight management computer is configured so as to:
  determine an initial speed profile along a current flight plan of the aircraft and transmit, to the guidance computer, a speed setpoint corresponding to the initial speed profile so as to pilot the aircraft in accordance with the initial speed profile in what is called a managed mode;
  in response to the reception of an RTA constraint at a point of the flight plan, determine what is called an RTA speed profile for complying with the RTA constraint and transmit, to the guidance computer, what is called an RTA speed setpoint corresponding to the RTA speed profile, so as to pilot the aircraft in accordance with the RTA speed profile in the managed mode,
  wherein the guidance computer is configured so as to:
  accept the reception of a setpoint speed, called selected speed, input by a flight crew member by way of a human-machine interface of the guidance computer when the guidance computer is piloting the aircraft in accordance with the RTA speed setpoint in managed mode; and
  activate what is called a selected mode in which the guidance computer pilots the aircraft at the selected speed.

This system is noteworthy in that the flight management computer is furthermore configured so as, in response to the activation of the selected mode in which the guidance computer pilots the aircraft at the selected speed, to:
  determine, when possible, what is called a deselection point, defined so as to allow the RTA constraint to be complied with when the aircraft is flying at the selected speed between a current position of the aircraft and the deselection point, and then in accordance with a predetermined speed profile between the deselection point and the point of the flight plan with which the RTA constraint is associated; and
  command the display, on a navigation screen in the cockpit of the aircraft, of a symbol corresponding to the current position of the aircraft, of a symbol corresponding to the position of the point of the flight plan with which the RTA constraint is associated, and of a symbol corresponding to the position of the deselection point.

Thus, the piloting assistance system of the aircraft makes it possible to assist a pilot of the aircraft in returning the aircraft to managed mode after the entry of a speed selected by way of the human-machine interface of the guidance computer. Displaying the position of the deselection point thus determined allows the pilot to know when he should return to managed mode if he wishes to rejoin the predetermined speed profile. As indicated, the deselection point is determined by the flight management computer such that the aircraft complies with the RTA constraint at the waypoint by flying at the selected speed to the deselection point, and then in accordance with the predetermined speed profile from the deselection point to the waypoint with which the RTA constraint is associated. Therefore, this deselection point has the advantage of making it possible to comply with the RTA constraint: the pilot, who chooses to return to managed mode, in accordance with the predetermined speed profile, when the aircraft arrives at the deselection point, is thus certain to comply with the RTA speed constraint.

In one embodiment, the flight management computer is configured so as to determine the deselection point such that the predetermined speed profile corresponds to one of the following speed profiles:
  the initial speed profile;
  what is called a minimum speed profile, corresponding to minimum operational speed values of the aircraft along the flight plan; or
  what is called a maximum speed profile, corresponding to maximum operational speed values of the aircraft along the flight plan.

Advantageously, the flight management computer is configured so as to:
  determine a first deselection point corresponding to the initial speed profile and a second deselection point corresponding to one of the minimum speed profile and of the maximum speed profile; and
  command the display, on the navigation screen in the cockpit of the aircraft, of a symbol corresponding to the position of the first deselection point and of a symbol corresponding to the position of the second deselection point.

In one embodiment, the flight management computer is configured so as to determine the deselection point using a dichotomy method.

In one particular embodiment, the flight management computer is configured so as to determine a point, called midpoint, corresponding to the middle of the interval under consideration along the flight plan between the current position of the aircraft and the point corresponding to the RTA constraint, and then to determine the deselection point through iterations in the interval under consideration along the flight plan between the current position of the aircraft and the midpoint.

In another particular embodiment, the initial speed profile corresponds to an optimum speed profile determined so as to optimize a usage criterion of the aircraft, in particular the fuel consumption of the aircraft along the flight plan.

The invention also relates to a piloting assistance method for an aircraft, the aircraft comprising a flight management computer and a guidance computer, the method comprising the following steps implemented by the flight management computer:
  determining an initial speed profile along a current flight plan of the aircraft and transmitting, to the guidance computer, a speed setpoint corresponding to the initial speed profile so as to pilot the aircraft in accordance with the initial speed profile in what is called a managed mode;
  in response to the reception of an RTA constraint at a point of the flight plan, determining what is called an RTA speed profile for complying with the RTA constraint and transmitting, to the guidance computer, what is called an RTA speed setpoint corresponding to the RTA speed profile, so as to pilot the aircraft in accordance with the RTA speed profile in the managed mode,
  and the following steps implemented by the guidance computer:
  accepting the reception of a setpoint speed, called selected speed, input by a flight crew member by way of a human-machine interface of the guidance computer when the guidance computer is piloting the aircraft in accordance with the RTA speed setpoint in managed mode; and
  activating what is called a selected mode in which the guidance computer pilots the aircraft at the selected speed.

The method is noteworthy in that it furthermore comprises the following steps implemented by the flight management computer, in response to the activation of the selected mode in which the guidance computer pilots the aircraft at the selected speed:

determining, when possible, what is called a deselection point defined so as to allow the RTA constraint to be complied with when the aircraft is flying at the selected speed between a current position of the aircraft and the deselection point, and then in accordance with a predetermined speed profile between the deselection point and the point of the flight plan with which the RTA constraint is associated; and commanding the display, on a navigation screen in the cockpit of the aircraft, of a symbol corresponding to the current position of the aircraft, of a symbol corresponding to the position of the point of the flight plan with which the RTA constraint is associated, and of a symbol corresponding to the position of the deselection point.

In one embodiment, the deselection point is determined such that the predetermined speed profile corresponds to one of the following speed profiles:

the initial speed profile;

what is called a minimum speed profile, corresponding to minimum operational speed values of the aircraft along the flight plan; or what is called a maximum speed profile, corresponding to maximum operational speed values of the aircraft along the flight plan.

Advantageously, the method comprises the following steps implemented by the flight management computer:

determining a first deselection point corresponding to the initial speed profile and a second deselection point corresponding to one of the minimum speed profile and of the maximum speed profile; and commanding the display, on the navigation screen in the cockpit of the aircraft, of a symbol corresponding to the position of the first deselection point and of a symbol corresponding to the position of the second deselection point.

In one embodiment, the deselection point is determined using a dichotomy method.

In one particular embodiment, the method furthermore comprises determining a point, called midpoint, corresponding to the middle of the interval under consideration along the flight plan between the current position of the aircraft and the point corresponding to the RTA constraint, and then determining the deselection point through iterations in the interval under consideration along the flight plan between the current position of the aircraft and the midpoint.

In another particular embodiment, the initial speed profile corresponds to an optimum speed profile determined so as to optimize a usage criterion of the aircraft, in particular the fuel consumption of the aircraft along the flight plan.

The invention also relates to an aircraft including a piloting assistance system as set out above.

BRIEF DESCRIPTION OF THE DRAWINGS

The invention will be better understood on reading the following description and on examining the appended figures.

DETAILED DESCRIPTION OF THE PREFERRED EMBODIMENTS

Figure 1:
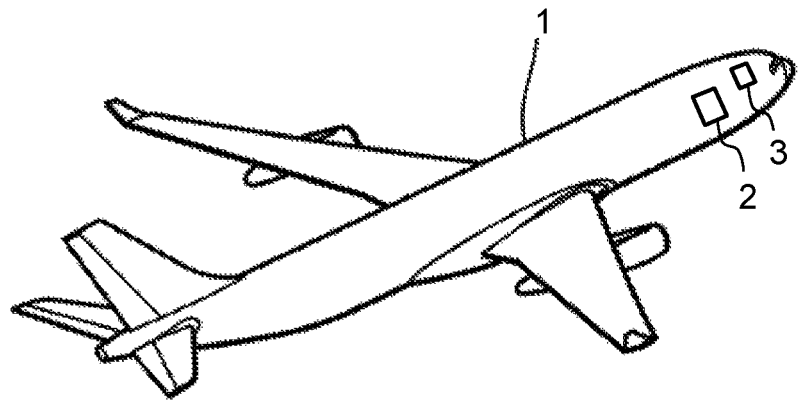
FIG. 1 shows an aircraft comprising a piloting assistance system according to the invention.
Figure 2:
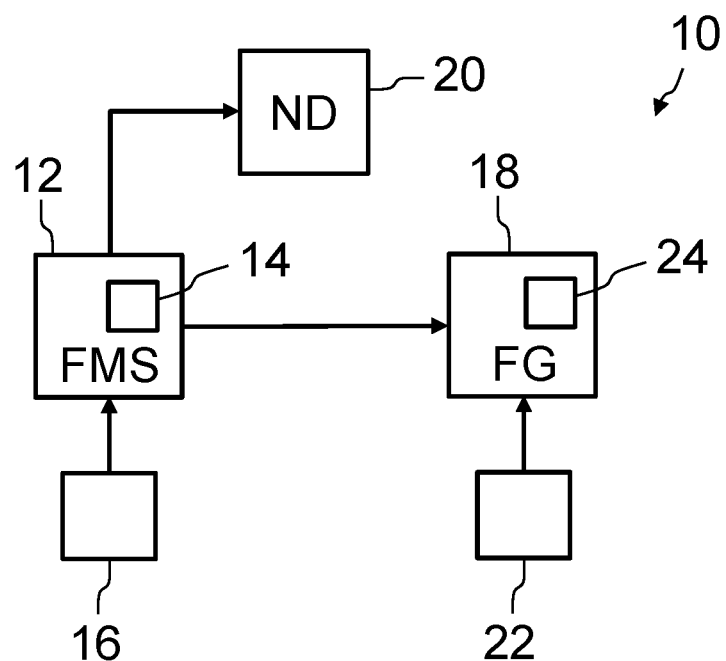
FIG. 2 is a schematic overview of a system for piloting an aircraft, according to the invention.

The system 10 shown schematically in FIG. 2 is in accordance with one embodiment of the invention. It is embedded on board an aircraft 1 as shown in FIG. 1, in particular, a civil transport plane or a military transport plane, for the purpose of assisting this aircraft in flying on a flight plan, while complying with an RTA time of arrival constraint at a waypoint of the flight plan. This system is installed for example in an avionics bay 2 of the aircraft. The system 10 includes a flight management computer 12 for managing the flight of the aircraft, in particular an FMS (flight management system) computer. This flight management computer comprises a processing unit 14. It also comprises a memory, not shown, intended to store at least one flight plan of the aircraft. The flight management computer 12 is linked, at input, to a first human-machine interface 16, preferably situated in the cockpit 3 of the aircraft. This human-machine interface corresponds, in particular, to an assembly comprising a screen, a keypad and/or a pointing unit, for example an MCDU (multi-purpose control and display unit) unit. An output of the flight management computer 12 is linked to an input of a navigation screen 20 in the cockpit 3 of the aircraft, labelled ND (Navigation Display) in the figure. Another output of the flight management computer 12 is linked to an input of a guidance computer 18 of the aircraft, in particular an FG (flight guidance) computer. The guidance computer 18 is linked, at input, to a second human-machine interface 22, preferably situated in the cockpit 3 of the aircraft. This human-machine interface corresponds, in particular, to an FCU (flight control unit) device. The guidance computer 18 includes an automatic piloting unit 24 intended to guide the aircraft in accordance with an automatic guidance mode (when automatic piloting of the aircraft is engaged) or in accordance with a manual guidance mode, for example by way of a flight director. The automatic piloting unit 24 corresponds, for example, to a software function of the guidance computer 18. With regard to speed control, the guidance computer includes a first, what is called managed mode, in which the automatic piloting unit 24 controls the speed of the aircraft on the basis of speed setpoints received from the flight management computer 12, and a second, what is called selected mode, in which the automatic piloting unit 24 controls the speed of the aircraft on the basis of speed setpoints selected by a flight crew member by way of the human-machine interface 22. To automatically control the speed of the aircraft, the automatic piloting unit 24 is, for example, configured so as to transmit setpoints to an auto-thrust or auto-throttle system of the aircraft.

During operation, before a flight of the aircraft, a flight crew member, in particular a pilot of the aircraft, defines an initial flight plan for this flight of the aircraft, and he enters this flight plan into the flight management computer 12 by way of the human-machine interface 16. This initial flight plan comprises an initial speed profile of the aircraft. The flight management computer stores the initial flight plan and the initial speed profile in its memory. Advantageously, as indicated above, the initial speed profile is defined, for example, on the basis of a cost index so as to optimize a usage criterion of the aircraft, for example fuel consumption. The initial speed profile then corresponds to an optimum speed profile.

During the flight of the aircraft, the flight management computer commands the guidance computer 18 of the aircraft so as to guide the aircraft in accordance with the initial flight plan and the initial speed profile. In particular, the flight management computer 12 transmits, to the guidance computer 18, a speed setpoint corresponding to the initial speed profile, such that the guidance computer pilots the aircraft in accordance with the initial speed profile in managed mode.

Air traffic control may have to send the pilot of the aircraft an RTA time of arrival constraint associated with a waypoint of the flight plan. If the pilot approves this RTA constraint, he enters it into the flight management computer by way of the first human-machine interface 16. The flight management computer 12 then determines what is called an RTA speed profile of the aircraft for complying with the RTA constraint, and it then transmits, to the guidance computer 18, what is called an RTA setpoint such that the guidance computer pilots the aircraft in accordance with the RTA speed profile in managed mode.

Sometimes, while the speed of the aircraft is piloted in accordance with the RTA speed profile in managed mode, the pilot of the aircraft may wish to modify the speed of the aircraft as a one-off, for example to make up for a delay or an advance with respect to the RTA constraint more quickly. In such a situation, the pilot inputs and confirms a desired speed value, called selected speed, by way of the second FCU human-machine interface 22. The guidance computer 18 that receives this selected speed then modifies its guidance mode, so as to change from the managed guidance mode (in which it was piloting the aircraft in accordance with the RTA speed profile in managed mode) to a selected guidance mode in which it pilots the aircraft at the selected speed.

Following the change to selected mode in order to control the speed of the aircraft using the guidance computer 18, the flight management computer 12 determines a point of the flight plan of the aircraft, called deselection point, defined so as to allow the RTA constraint to be complied with when the aircraft is flying at the selected speed between a current position of the aircraft and the deselection point, and then flies in accordance with a predetermined speed profile between the deselection point and the point of the flight plan with which the RTA constraint is associated. The deselection point is, for example, determined through successive iterations between the current position of the aircraft and the point of the flight plan with which the RTA constraint is associated until finding a value of the deselection point making it possible to achieve an estimated time of arrival ETA at the point of the flight plan with which the RTA constraint is associated that is close enough to the RTA constraint. In particular, this estimated time of arrival is considered to be close enough to the RTA constraint when the difference between this estimated time of arrival and the RTA constraint is less, in terms of absolute value, than a predetermined time, for example chosen within an interval of 10 to 30 seconds. In one particular embodiment, the various iterations corresponding to the determination of the deselection point are implemented using a dichotomy method.

Advantageously, the flight management computer 12 furthermore determines a midpoint corresponding to the middle of the interval under consideration along the flight plan between the current position of the aircraft and the point corresponding to the RTA constraint. It then determines the deselection point through iterations in the interval under consideration along the flight plan, between the current position of the aircraft and the midpoint. This allows faster determination of the deselection point, since the iterations are performed only over the first half of the interval.

Figure 3:
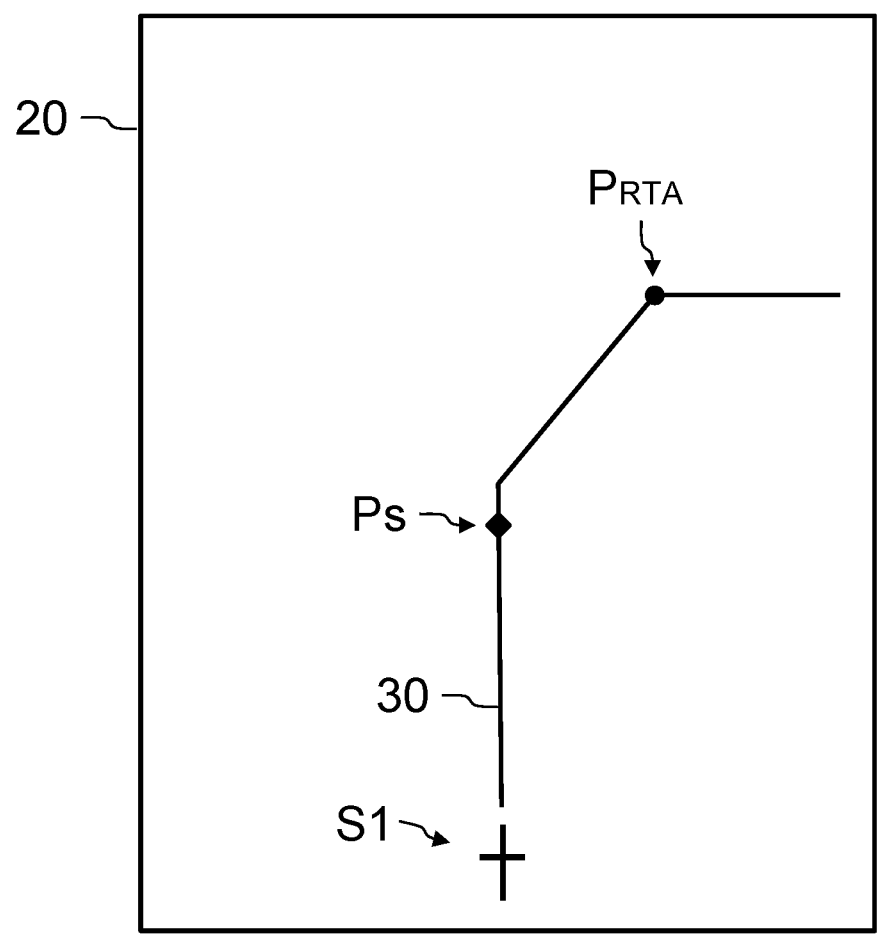
FIGS. 3, 4 and 5 show displays on a screen in the cockpit of the aircraft, according to embodiments of the invention.

After having determined the deselection point, the flight management computer 12 commands the display, on the navigation screen 20 in the cockpit of the aircraft, of a symbol S 1 corresponding to the current position of the aircraft, of a symbol PRTA corresponding to the position of the point of the flight plan with which the RTA constraint is associated, and of a symbol PS corresponding to the position of the deselection point, as illustrated in FIG. 3. Usually, a depiction 30 of the current flight plan of the aircraft is also displayed on the navigation screen.

The invention thus makes it possible to assist the pilot in complying with the RTA constraint. Specifically, the pilot is easily able to see the position of the deselection point, illustrated by the symbol PS, in relation to the current position of the aircraft, illustrated by the symbol S 1, and to the position of the point of the flight plan with which the RTA constraint is associated, illustrated by the symbol PRTA. Given that the deselection point is determined so as to allow the RTA constraint to be complied with when the aircraft is flying at the selected speed between the current position of the aircraft and the deselection point, and then in accordance with the predetermined speed profile between the deselection point and the point of the flight plan with which the RTA constraint is associated, the pilot knows that he is able to maintain the selected speed until the aircraft arrives at the deselection point, that is to say, until the symbols S 1 and PS are superimposed on the navigation screen. When the aircraft arrives at the deselection point, the pilot is able to command the change from selected mode to managed mode, in which the guidance computer pilots the aircraft in accordance with the predetermined speed profile: the pilot is thus certain of being able to comply with the RTA constraint. To this end, the guidance computer 18 is configured so as to accept a corresponding setpoint, input and confirmed by the pilot by way of the second FCU human-machine interface 22.

In one embodiment of the invention, the predetermined speed profile corresponds to one of the following speed profiles:
  the initial speed profile;
  what is called a minimum speed profile, corresponding to minimum operational speed values of the aircraft along the flight plan; or
  what is called a maximum speed profile, corresponding to maximum operational speed values of the aircraft along the flight plan.

Advantageously, the flight management computer 12 determines a first deselection point corresponding to the initial speed profile and a second deselection point corresponding to one of the minimum speed profile and of the maximum speed profile. The flight management computer 12 then commands the display, on the navigation screen in the cockpit of the aircraft, of a symbol corresponding to the position of the first deselection point and of a symbol corresponding to the position of the second deselection point.

Figure 4:
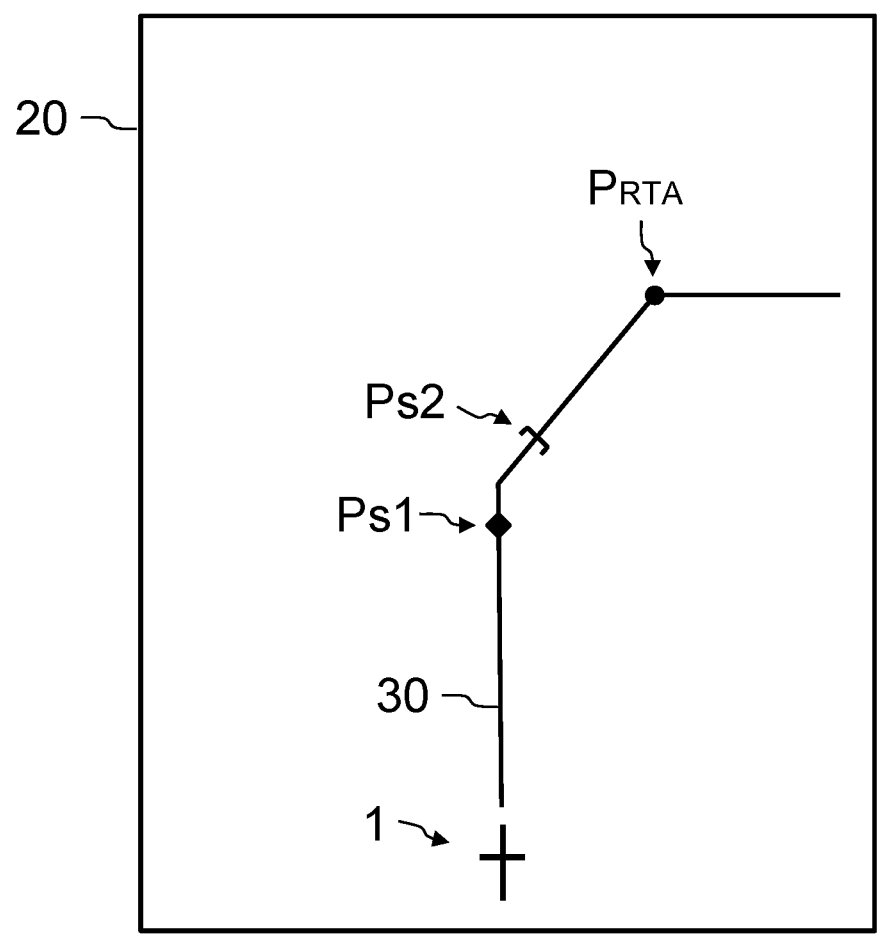

FIG. 4 illustrates a first example of a display on the navigation screen 20, in which the flight management computer 12 commands the display, on the navigation screen, of a symbol PS1 corresponding to the position of the first deselection point (for which the predetermined speed profile corresponds to the initial speed profile) and of a symbol PS2 corresponding to the position of the second deselection point when the predetermined speed profile corresponds to the maximum speed profile.

Figure 5:
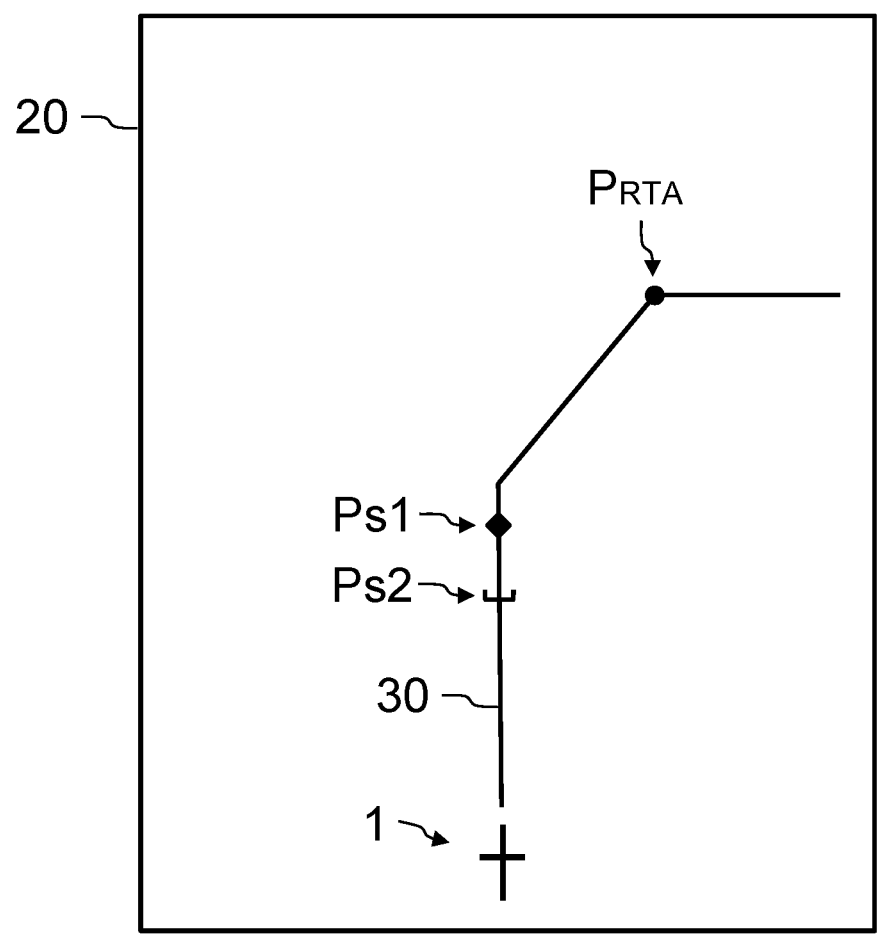

FIG. 5 illustrates a second example of a display on the navigation screen 20, in which the flight management computer 12 commands the display, on the navigation screen, of a symbol PS corresponding to the position of the first deselection point (for which the predetermined speed profile corresponds to the initial speed profile) and of a symbol PS2 corresponding to the position of the second deselection point when the predetermined speed profile corresponds to the minimum speed profile.

When the initial speed profile is an optimum speed profile as indicated above (for example defined by a cost index), the invention allows the pilot to command the return to managed mode, in which the guidance computer 18 pilots the aircraft in accordance with the optimum speed profile, starting from the deselection point illustrated by the symbol PS1 in FIGS. 4 and 5. It is thus not necessary to wait for the aircraft to arrive at the point of the flight plan corresponding to the RTA constraint to return to this optimum speed profile. This anticipation of the return to the optimum speed profile makes it possible to better optimize the usage of the aircraft, for example its fuel consumption.

In one particular embodiment, the flight management computer 12 and the guidance computer 18 of the aircraft are integrated into a mixed FMGC flight management and guidance computer.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A piloting assistance system for an aircraft, said system comprising:
   a flight management computer for managing a flight of the aircraft, and
   a guidance computer for guiding the aircraft,
   wherein the flight management computer is configured to:
      determine an initial speed profile along a current flight plan of the aircraft and transmit, to the guidance computer, a speed setpoint corresponding to the initial speed profile so as to pilot the aircraft in accordance with said initial speed profile in a managed mode which is an operating mode of the guidance computer in which the guidance computer commands the speed of the aircraft on the basis of speed setpoints received automatically from the flight management computer;
      in response to a reception of an RTA constraint at a point of the flight plan, determine an RTA speed profile for complying with said RTA constraint and transmit, to the guidance computer, an RTA speed setpoint corresponding to the RTA speed profile, so as to pilot the aircraft in accordance with said RTA speed profile in the managed mode,
   wherein the guidance computer is configured to:
      accept the reception of a setpoint speed, called selected speed, input by a flight crew member by way of a human-machine interface of said guidance computer when the guidance computer is piloting the aircraft in accordance with the RTA speed setpoint in managed mode; and
      activate a selected mode which is an operating mode of the guidance computer in which the guidance computer commands the speed of the aircraft on the basis of the selected speed inputted by the flight crew member,
   wherein the flight management computer is furthermore configured, in response to the activation of the selected mode in which the guidance computer pilots the aircraft at the selected speed, to:
      determine a deselection point defined so as to allow the RTA constraint to be complied with when the aircraft is flying at the selected speed, in the selected mode, between a current position of the aircraft and the deselection point, and then in accordance with a predetermined speed profile, in the managed mode, between the deselection point and the point of the flight plan with which the RTA constraint is associated; and
      command a display, on a navigation screen in a cockpit of the aircraft, of a symbol corresponding to the current position of the aircraft, of a symbol corresponding to the position of the point of the flight plan with which the RTA constraint is associated, and of a symbol corresponding to the position of the deselection point, wherein, along the flight plan, the deselection point is between the current position of the aircraft and the point of the flight plan with which the RTA constraint is associated.

2. The system according to claim 1, wherein the flight management computer is configured so as to determine the deselection point such that the predetermined speed profile corresponds to one of the following speed profiles:
   the initial speed profile;
   a minimum speed profile, corresponding to minimum operational speed values of the aircraft along the flight plan; or
   a maximum speed profile, corresponding to maximum operational speed values of the aircraft along the flight plan.

3. The system according to claim 2, wherein the flight management computer is configured so as to:
   determine a first deselection point corresponding to the initial speed profile and a second deselection point corresponding to one of the minimum speed profile and of the maximum speed profile; and
   command a display, on the navigation screen in the cockpit of the aircraft, of a symbol corresponding to the position of the first deselection point and of a symbol corresponding to the position of the second deselection point.

4. The system according to claim 2, wherein the initial speed profile corresponds to an optimum speed profile determined so as to optimize a usage criterion of the aircraft.

5. The system according to claim 4, wherein the usage criterion comprises a fuel consumption of the aircraft along the flight plan.

6. The system according to claim 1, wherein the flight management computer is configured so as to determine the deselection point using a dichotomy method.

7. The system according to claim 1, wherein the flight management computer is configured so as to determine a point, called midpoint, corresponding to a middle of an interval under consideration along the flight plan between the current position of the aircraft and the point corresponding to the RTA constraint, and then to determine the deselection point through iterations in the interval under consideration along the flight plan between the current position of the aircraft and the midpoint.

8. A method for assisting piloting of an aircraft, the aircraft comprising a flight management computer and a guidance computer, the method comprising:

the following steps implemented by the flight management computer:

determining an initial speed profile along a current flight plan of the aircraft and transmitting, to the guidance computer, a speed setpoint corresponding to the initial speed profile so as to pilot the aircraft in accordance with said initial speed profile in a managed mode which is an operating mode of the guidance computer in which the guidance computer commands the speed of the aircraft on the basis of speed setpoints received automatically from the flight management computer;

in response to a reception an RTA constraint at a point of the flight plan, determining an RTA speed profile for complying with said RTA constraint and transmitting, to the guidance computer, an RTA speed setpoint corresponding to the RTA speed profile, so as to pilot the aircraft in accordance with said RTA speed profile in the managed mode, and the following steps implemented by the guidance computer:

accepting a reception of a setpoint speed, called selected speed, input by a flight crew member by way of a human-machine interface of said guidance computer when the guidance computer is piloting the aircraft in accordance with the RTA speed setpoint in managed mode; and activating a selected mode which is an operating mode of the guidance computer in which the guidance computer commands the speed of the aircraft on the basis of the selected speed inputted by the flight crew member, the method furthermore comprising the following steps implemented by the flight management computer, in response to the activation of the selected mode in which the guidance computer pilots the aircraft at the selected speed:

determining a deselection point defined to allow the RTA constraint to be complied with when the aircraft is flying at the selected speed, in the selected mode, between a current position of the aircraft and the deselection point, and then in accordance with a predetermined speed profile, in the managed mode, between the deselection point and the point of the flight plan with which the RTA constraint is associated; and commanding a display, on a navigation screen in a cockpit of the aircraft, of a symbol corresponding to the current position of the aircraft, of a symbol corresponding to the position of the point of the flight plan with which the RTA constraint is associated, and of a symbol corresponding to the position of the deselection point, wherein, along the flight plan, the deselection point is between the current position of the aircraft and the point of the flight plan with which the RTA constraint is associated.

9. The method according to claim 8, wherein the deselection point is determined such that the predetermined speed profile corresponds to one of the following speed profiles:

the initial speed profile;

a minimum speed profile, corresponding to minimum operational speed values of the aircraft along the flight plan; or a maximum speed profile, corresponding to maximum operational speed values of the aircraft along the flight plan.

10. The method according to claim 9, further comprising the following steps implemented by the flight management computer:

determining a first deselection point corresponding to the initial speed profile and a second deselection point corresponding to one of the minimum speed profile and of the maximum speed profile; and commanding a display, on the navigation screen in the cockpit of the aircraft, of a symbol corresponding to the position of the first deselection point and of a symbol corresponding to the position of the second deselection point.

11. The method according to claim 8, wherein the deselection point is determined using a dichotomy method.

12. The method according to claim 8, wherein the initial speed profile corresponds to an optimum speed profile determined so as to optimize a usage criterion of the aircraft.

13. The method according to claim 12, wherein the usage criterion comprises a fuel consumption of the aircraft along the flight plan.

14. An aircraft comprising a piloting assistance system according to claim 1.

* * * * *